(12) United States Patent
Shimada

(10) Patent No.: US 6,591,189 B2
(45) Date of Patent: Jul. 8, 2003

(54) MOBILE UNIT NAVIGATION SYSTEM AND MOBILE UNIT NAVIGATION METHOD

(75) Inventor: Yasuyuki Shimada, Tokyo (JP)

(73) Assignee: Mitsubishi Denke Kabushiki Kaisha, Tokyo (JP)

(*) Notice: Subject to any disclaimer, the term of this patent is extended or adjusted under 35 U.S.C. 154(b) by 0 days.

(21) Appl. No.: 09/951,213

(22) Filed: Sep. 11, 2001

(65) Prior Publication Data

US 2002/0152025 A1 Oct. 17, 2002

(30) Foreign Application Priority Data

Apr. 16, 2001 (JP) ........................................ 2001-117133

(51) Int. Cl.⁷ .............................................. G01C 21/30
(52) U.S. Cl. ...................... 701/209; 701/208; 701/210; 701/211; 701/214; 342/357.02; 342/357.03; 340/988; 340/990; 340/995
(58) Field of Search ................................ 701/207, 208, 701/209, 210, 211, 213, 214, 215; 340/988, 990, 995; 342/357.02, 357.03, 357.06, 357.17, 357.13

(56) References Cited

U.S. PATENT DOCUMENTS 5,926,118 A * 7/1999 Hayashida et al. ......... 340/995
6,064,941 A * 5/2000 Nimura et al. .............. 340/988
6,230,098 B1 * 5/2001 Ando et al. .................. 340/990

FOREIGN PATENT DOCUMENTS

| JP | A9287969 | 11/1997 | |
| JP | 10096644 A | * 4/1998 | ........... G01C/21/00 |
| JP | A10267677 | 10/1998 | |

* cited by examiner

Primary Examiner—Jacques H. Louis-Jacques
(74) Attorney, Agent, or Firm—Birch, Stewart, Kolasch & Birch, LLP

(57) ABSTRACT

A mobile unit navigation system has a position detection unit 10 for a mobile unit, a map information acquisition unit 20, a destination input unit 30, a route search unit 40 for searching for a guide route from the current position to the destination, and an output unit 50 for displaying the found guide route as an image or guiding a user along the found guide route with voice. The unit 40 has a move route extraction unit for extracting a move route of the mobile unit based on a move path of the mobile unit provided by the detection unit 10 and the map information, a differential route registration unit for extracting a differential route different from the guide route from the extracted move route and registering the differential route, and a differential route application unit for applying the registered differential route to searching for the guide route.

19 Claims, 3 Drawing Sheets

●————● : ORIGINAL GUIDE ROUTE
●————● : MOVE ROUTE OF MOBILE UNIT

MOBILE UNIT NAVIGATION SYSTEM AND MOBILE UNIT NAVIGATION METHOD

BACKGROUND OF THE INVENTION

1. Field of the Invention

This invention relates to mobile unit navigation and in particular to a mobile unit navigation system and a mobile unit navigation method having a function of learning a differential route between the move route of a mobile unit and the guide route and applying the learn result to the guide route.

2. Description of the Related Art

In a mobile unit navigation system in a related art, the current position of a mobile unit is detected using the GPS (Global Positioning System), etc., and a destination is entered, whereby a search is made for the shortest route from the current position to the destination and the driver is guided with map display or voice, thereby attempting to realize a comfortable move of the mobile unit.

Several arts are shown for reflecting the actual move path of a mobile unit on searching for a guide route so as to provide the user with the optimum guide route to the destination as much as possible. For example, JP-A-9-287969 describes an art of storing the run paths of a vehicle and making a route search with the more frequently applied run path taking precedence over any other run path in a navigation system for a vehicle disclosed in JP-A-9-287969.

However, in the navigation system in the related art, the run path is applied to the guide route with the search cost suppressed for the run path and thus the necessary run path is not necessarily applied to the guide route depending on the setup search cost or conversely an unnecessary run path is applied, etc., namely, the user is guided along the route not intended by the user; this is a problem.

Since all run paths are registered, the capacity of storage means for storing the run paths becomes enormous and the system becomes expensive; this is also a problem.

SUMMARY OF THE INVENTION

It is therefore an object of the invention to provide a mobile unit navigation system and a mobile unit navigation method for learning a differential route between the move route of a mobile unit and the guide route and applying the learn result to the guide route, whereby the practical guide route fitted to the user's taste can be provided.

To the end, according to the invention, there is provided a mobile unit navigation system comprising position detection means for detecting the current position of a mobile unit, map information acquisition means for acquiring map information from a storage medium or an external system, input means for specifying a destination, route search means for searching for a guide route from the current position to the destination based on the map information, and output means for displaying the found guide route as an image or guiding a user along the found guide route with voice, wherein the route search means comprises move route extraction means for extracting a move route of the mobile unit based on a move path of the mobile unit provided by the position detection means and the map information, differential route registration means for extracting a differential route different from the guide route from the extracted move route and registering the differential route, and differential route application means for applying the registered differential route to searching for the guide route.

In the mobile unit navigation system according to the invention, the move route extraction means comprises correction means, if the extracted move route contains a discontinuous part, for correcting the move route to a continuous move route by complementing the discontinuous part based on the peripheral map information.

In the mobile unit navigation system according to the invention, the differential route is a continuous link chain.

In the mobile unit navigation system according to the invention, the differential route application means replaces a part of the guide route with the differential route.

In the mobile unit navigation system according to the invention, if the start point and the end point of the differential route are contained on the guide route, the differential route application means replaces the corresponding portion of the guide route from the start point to the end point with the differential route.

In the mobile unit navigation system according to the invention, the differential route registration means registers each differential route to which additional information indicating the attribute and history of the differential route is added.

In the mobile unit navigation system according to the invention, the additional information contains any of the following or any combination thereof:

1) Registration date and time of differential route;
2) move date and time of mobile unit on differential route;
3) number of times mobile unit has been moved on differential route;
4) move direction of mobile unit on differential route;
5) required time for mobile unit to pass through differential route;
6) passage speed of mobile unit on differential route;
7) position and direction of differential route;
8) route length of differential route;
9) road width of differential route;
10) number of lanes of differential route;
11) inclination degree of differential route;
12) pavement percentage of differential route;
13) open date of differential route;
14) toll required for differential route;
15) limited speed on differential route;
16) limited height on differential route;
17) limited weight on differential route;
18) traffic control on differential route (number of lanes, travel in one direction only, chain, etc.,) and period and times of traffic control;
19) duplication degree with other differential routes; and
20) number of times differential route has been applied to guide route.

In the mobile unit navigation system according to the invention, the differential route application means comprises priority determination means for determining priority of each differential route based on the additional information and applies the differential route to searching for a guide route based on the determined priority.

In the mobile unit navigation system according to the invention, the differential route application means comprises differential route deletion means for deleting an unnecessary differential route based on the priority thereof.

In the mobile unit navigation system according to the invention, the differential route application means comprises application determination means for determining whether or not application of a differential route to a guide route is required.

In the mobile unit navigation system according to the invention, the application determination means determines whether or not application of a differential route to a guide route is required based on the positional relationship between the current position of the mobile unit and the destination.

The mobile unit navigation system according to the invention further comprises road traffic information acquisition means for acquiring road traffic information from an external system, wherein the application determination means determines whether or not application of a differential route to a guide route is required based on the road traffic information concerning the differential route.

In the mobile unit navigation system according to the invention, the input means comprises application condition input means entering an application condition of a differential route to a guide route and the application determination means determines whether or not application of the differential route to the guide route is required based on the entered application condition.

In the mobile unit navigation system according to the invention, the differential route application means comprises application determination means for determining whether or not application of a differential route to a guide route is required and the application determination means determines whether or not application of the differential route to the guide route is required based on the priority of the differential route.

In the mobile unit navigation system according to the invention, the output means comprises discriminate output means for discriminately displaying each differential route registered by the differential route registration means or each differential route applied to a guide route as an image or guiding the use along the discriminated differential route with voice.

In the mobile unit navigation system according to the invention, when the current position of the mobile unit exists in the proximity of an entry point into the differential route applied to the guide route or in the proximity on the differential route, the discriminate output means discriminately displays the differential route as an image or guiding the use along the discriminated differential route with voice.

In the mobile unit navigation system according to the invention, the input means comprises discriminate information input means for adding discriminate information to additional information to each differential route registered by the differential route registration means.

In the mobile unit navigation system according to the invention, the discriminate information contains the identification name or identification number of each differential route or information indicating whether or not application of each differential route to a guide route is required.

According to the invention, there is provided a mobile unit navigation method comprising the position detection step of detecting the current position of a mobile unit, the map information acquisition step of acquiring map information from a storage medium or an external system, the input step of specifying a destination, the route search step of searching for a guide route from the current position to the destination based on the map information, and the output step of displaying the found guide route or guiding a user along the found guide route with voice, wherein the route search step comprises the move route extraction step of extracting a move route of the mobile unit based on a move path of the mobile unit provided by the position detection step and the map information, the differential route registration step of extracting a differential route different from the guide route from the extracted move route and registering the differential route, and the differential route application step of applying the registered differential route to searching for the guide route.

DETAILED DESCRIPTION OF THE PREFERRED EMBODIMENTS

Referring now to the accompanying drawings, there are shown preferred embodiments of the invention. Embodiment 1.

First, the configuration of a mobile unit navigation system in an embodiment 1 of the invention will be discussed.

Figure 1:
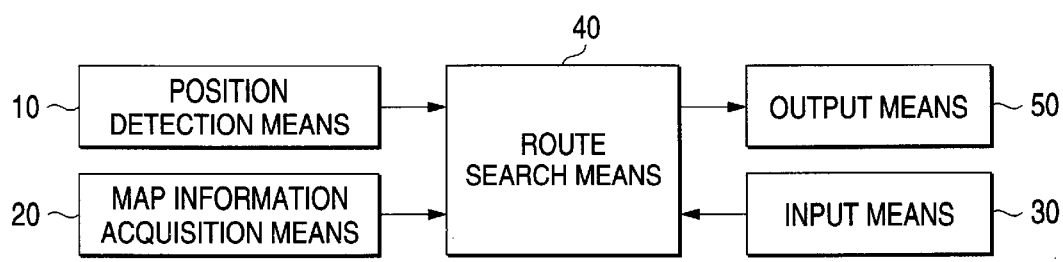
FIG. 1 is a block diagram to show the functional configuration of a mobile unit navigation system in an embodiment 1 of the invention.

FIG. 1 is a block diagram to show the functional configuration of the mobile unit navigation system in the embodiment 1 of the invention. Numeral 10 denotes position detection means for detecting the current position of a mobile unit, numeral 20 denotes map information acquisition means for acquiring map information from a storage medium or an external system, numeral 30 denotes input means for specifying a destination, numeral 40 denotes route search means for searching for a guide route from the current position to the destination based on the map information, and numeral 50 denotes output means for displaying the found guide route as an image or guiding the user along the found guide route with voice. The route search means 40 comprises move route extraction means for extracting the move route of the mobile unit based on the move path of the mobile unit provided by the position detection means 10 and the map information, differential route registration means for extracting the differential route different from the guide route from the extracted move route and registering the differential route, and differential route application means for applying the registered differential route to searching for the guide route although the means are not shown.

Figure 2:
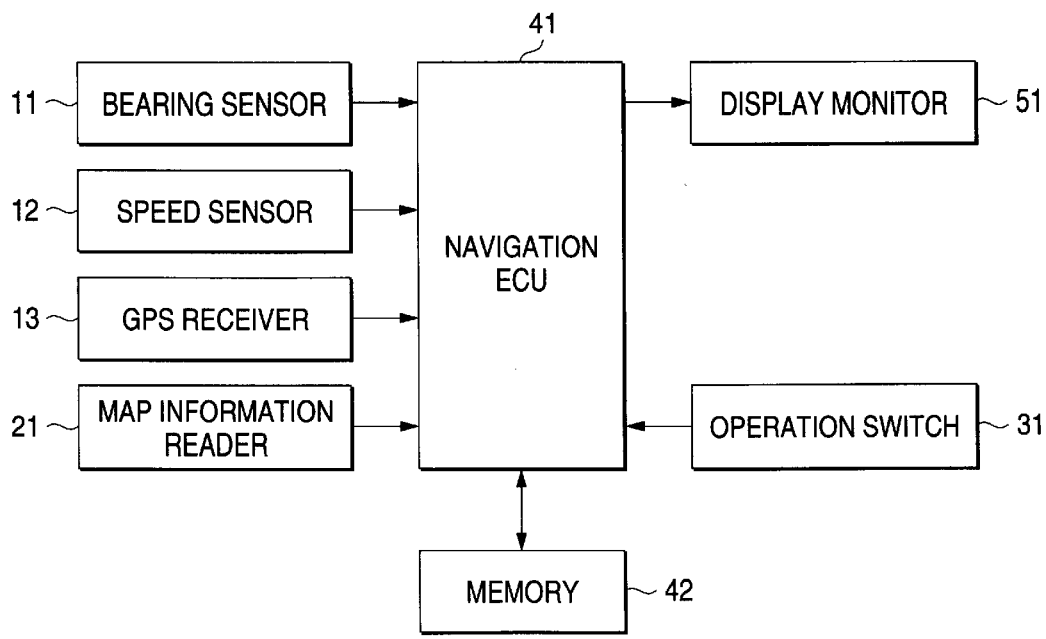
FIG. 2 is a block diagram to show the hardware configuration of the mobile unit navigation system in the embodiment 1 of the invention.

FIG. 2 is a block diagram to show the hardware configuration of the mobile unit navigation system in the embodiment 1 of the invention. Numeral 11 denotes a bearing sensor of a gyro, a geomagnetic sensor, etc., for detecting the bearing of the mobile unit, numeral 12 denotes a speed sensor for detecting the speed and the move distance of the mobile unit, and numeral 13 denotes a GPS receiver for calculating the current position based on information received from a GPS satellite, the components 11, 12, and 13 corresponding to the position detection means 10 in FIG. 1. Numeral 21 denotes a map information reader for reading map information containing road network data stored on a map information storage medium, such as CD-ROM (Compact Disc—Read-Only memory) or DVD-ROM (Digital Versatile Disk—Read-Only memory), corresponding to the map information acquisition means 20 in FIG. 1. Numeral 31 denotes an operation switch for entering a destination, etc., corresponding to the input means 30 in FIG. 1. Numeral 41 denotes a navigation ECU (electronic control unit) for performing route search processing and numeral 42 denotes memory as storage means for storing processing data, the components 41 and 42 corresponding to the route search means 40 in FIG. 1. Numeral 51 denotes a display monitor for displaying the found guide route as an image or guiding the user along the found guide route with voice, corresponding to the output means 50 in FIG. 50.

Figure 3:
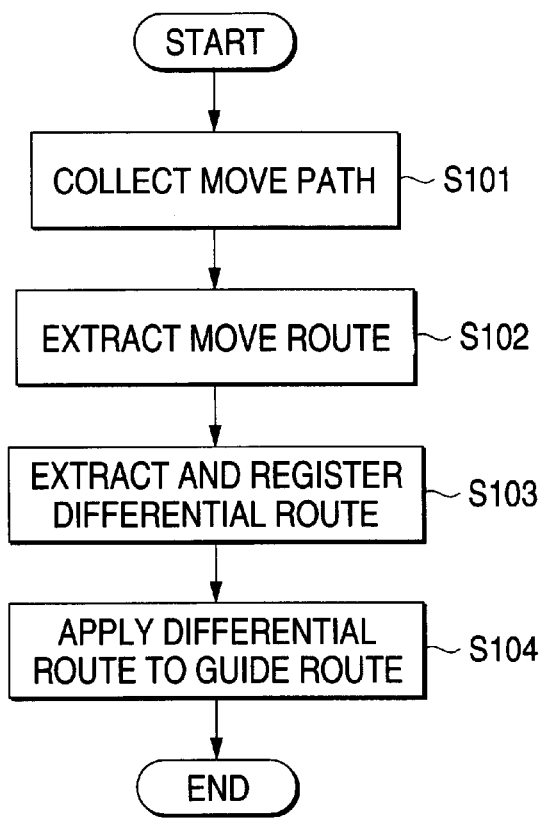
FIG. 3 is a flowchart to show the schematic operation of the mobile unit navigation system in the embodiment 1 of the invention.

The operation of the mobile unit navigation system in the embodiment 1 is as follows: FIG. 3 is a flowchart to show the schematic operation of the mobile unit navigation system in the embodiment 1.

First, the navigation ECU 41 searches for a guide route from the current position of the mobile unit detected by the bearing sensor 11, the speed sensor 12, and the GPS receiver 13 to the destination entered through the operation switch 31 based on the map information read through the map information reader 21. Next, a move path as a history of the current positions of the mobile unit is collected (S101) Next, the actual move route of the mobile unit is extracted based on the move path and the map information (S102). Next, the differential route different from the previous guide route is extracted from the extracted move route and is registered in the memory 42. Next, the registered differential route is applied to the next searching for the guide route (S104). The guide route found thus by applying the registered differential route thereto is output to the display monitor 51 and is displayed as an image or the user is guided along the found guide route with voice.

Thus, according to the mobile unit navigation system and the mobile unit navigation method having according to the embodiment 1, the route used by choice by the user is reflected on the guide route, so that the practical guide route fitted to the user's taste can be provided.

According to the embodiment 1, all move routes are not registered and only the differential routes are registered, so that the storage capacity of the memory 42 can be saved and an inexpensive system can be provided. Embodiment 2.

Next, a processing example of move route extraction means will be discussed as an embodiment 2.

Figure 4:
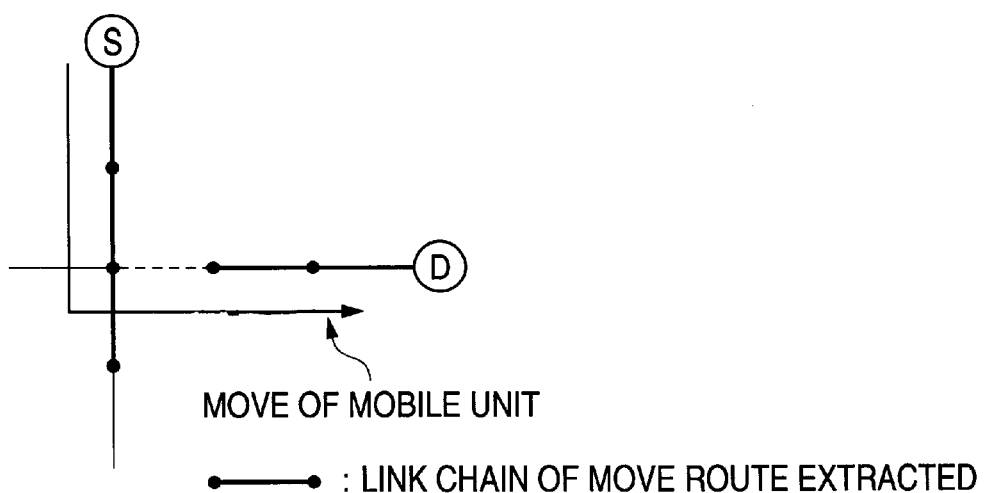
FIG. 4 is a drawing to show an extraction example of a move route in an embodiment 2 of the invention.

FIG. 4 shows an extraction example of a move route in the embodiment 2. The move path as a history of the current positions of the mobile unit detected by a bearing sensor 11, a speed sensor 12, and a GPS receiver 13 generally may contain a discontinuous part because of the effect of a detection error, etc. In such a case, the move route extracted from map information becomes a discontinuous link chain, as shown in FIG. 4.

Then, in the embodiment 2, move route extraction means is provided with correction means (not shown), if the extracted move route contains a discontinuous part, for correcting the move route to a continuous move route by complementing the discontinuous part based on the peripheral map information. That is, the correction means has a function of tracing the connection link from the links preceding and following the discontinuous part and editing the discontinuous move routes to one continuous move route.

According to the embodiment 2, continuous, proper differential route extraction can be promoted.

The differential route always becomes a continuous link chain and can be easily registered and applied to the guide route.

Embodiment 3.

Next, a processing example of differential route application means will be discussed as an embodiment 3.

Figure 5:
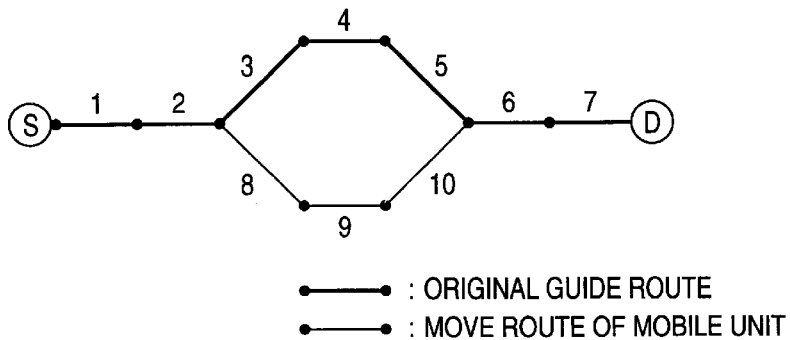
FIG. 5 is a drawing to show an application example of a differential route to a guide route in an embodiment 3 of the invention.

FIG. 5 shows an application example of a differential route to a guide route in the embodiment 3. The differential route application means determines whether or not the start point and the end point of a registered differential route (8, 9, 10) are contained on a guide route (1, 2, 3, 4, 5, 6, 7). If the start point and the end point are contained, the corresponding portion of the guide route (3, 4, 5) is replaced with the differential route (8, 9, 10), whereby the differential route is applied to the guide route.

According to the embodiment 3, route search processing wherein the differential route is applied to the guide route is facilitated.

Embodiment 4.

Next, a processing example of differential route application means with the embodiments 2 and 3 in combination will be discussed as an embodiment 4.

Figure 6:
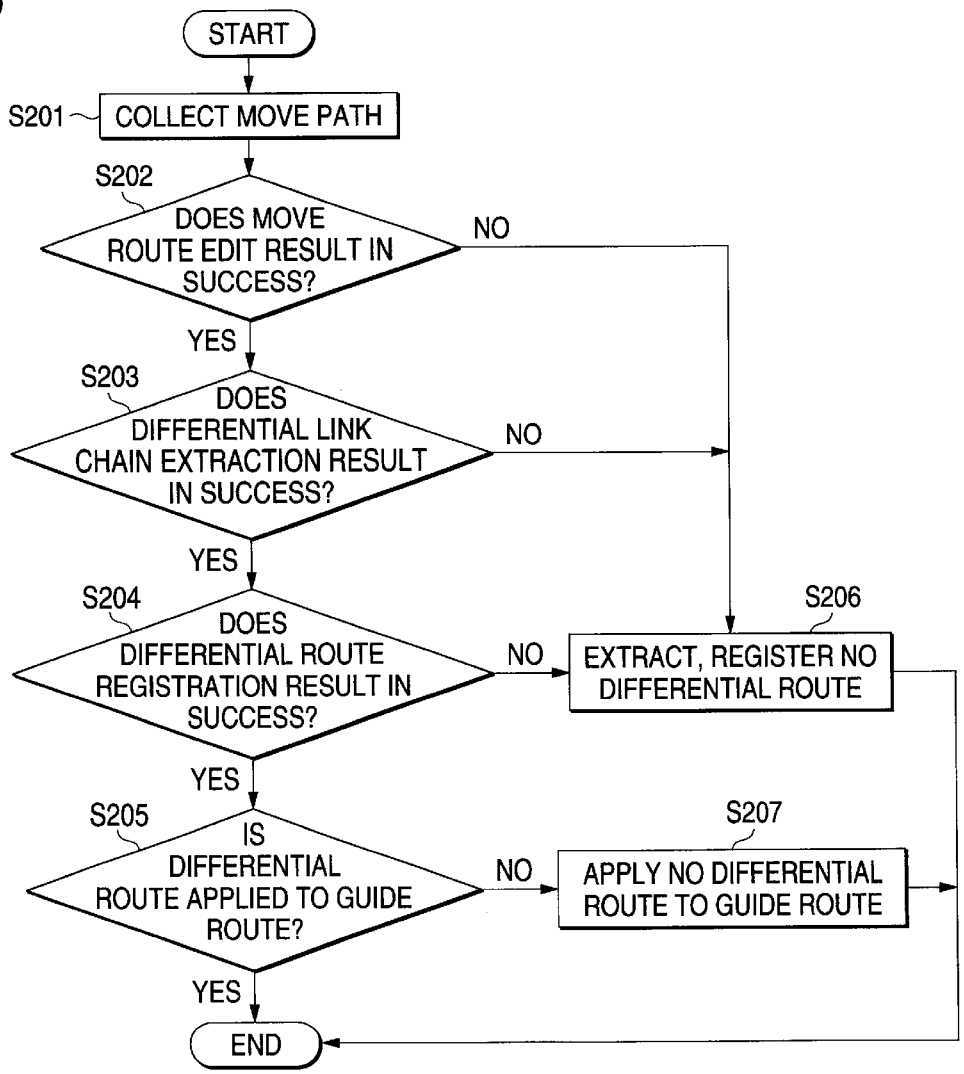
FIG. 6 is a flowchart to show the detailed operation of a mobile unit navigation system in an embodiment 4 of the invention.

FIG. 6 is a flowchart to show the detailed operation of a mobile unit navigation system in the embodiment 4. First, a navigation ECU 41 searches for a guide route from the current position of the mobile unit detected by a bearing sensor 11, a speed sensor 12, and a GPS receiver 13 to the destination entered through an operation switch 31 based on map information read through a map information reader 21. Next, a move path as a history of the current positions of the mobile unit is collected (S201). Next, the actual move route of the mobile unit is extracted as a link chain based on the move path and the map information and if the extracted link chain contains a discontinuous part, the connection link is traced from the links preceding and following the discontinuous part and the discontinuous move routes are edited to one continuous move route. If the editing results in failure, the subsequent differential route extraction and registration are not performed (S206). If the editing results in success, the post-edited move route is compared with the original guide route and the differential link chain between the post-edited move route and the original guide route is extracted as a differential route (S203). If no differential route exists, extraction is not executed (S206). Next, processing of registering the extracted differential route in memory 42 is performed (S204) If the memory 42 overflows, the differential route that can be registered is validated and the differential route overflowing from the memory 42 is not registered (S206). If the differential route can be registered normally, when a new route search is made, whether or not the start point and the end point of the registered differential route are contained on the found guide route is checked. If both the points are contained, the corresponding portion of the guide route is replaced with the differential route, whereby the differential route is applied to the guide route (S205). If only either of the points or neither of the points is contained, the differential route is not applied to the guide route (S207).

Thus, according to the embodiment 4, extraction and registration of the proper differential route as a continuous link chain and application of the registered differential route to the guide route can be executed easily.

Other modified embodiments based on the configurations previously described with reference to FIGS. 1 and 2 although they are not shown will be discussed.

Embodiment 5.

As an embodiment 5, differential route registration means may register each differential route to which additional information indicating the attribute and history of the differential route is added. That is, the attribute and history are registered with each differential route as additional information, whereby differential route application means uses the additional information as guidelines for determining the priority, application or no application, etc., when applying each registered differential route to the guide route.

According to the embodiment 5, appropriate determination in applying each differential route to the guide route can be promoted.

Embodiment 6.

As an embodiment 6, the additional information in the embodiment 5 may contain any of the following or any combination thereof:
1) Registration date and time of differential route;
2) move date and time of mobile unit on differential route;
3) number of times mobile unit has been moved on differential route;
4) move direction of mobile unit on differential route;
5) required time for mobile unit to pass through differential route;
6) passage speed of mobile unit on differential route;
7) position and direction of differential route;
8) route length of differential route;
9) road width of differential route;
10) number of lanes of differential route;
11) inclination degree of differential route;
12) pavement percentage of differential route;
13) open date of differential route;
14) toll required for differential route;
15) limited speed on differential route;
16) limited height on differential route;
17) limited weight on differential route;
18) traffic control on differential route (number of lanes, travel in one direction only, chain, etc.,) and period and times of traffic control;
19) duplication degree with other differential routes
20) number of times differential route has been applied to guide route.

That is, the additional information as mentioned above is registered with each differential route based on the position, speed, and bearing information from position detection means 10 and map information and when differential route application means determines the priority, application or no application, etc., when applying each differential route to the guide route, it can make a comprehensive determination with various conditions added.

According to the embodiment 6, practical information in applying each differential route to the guide route can be provided.

Embodiment 7.

As an embodiment 7, differential route application means may comprise priority determination means (not shown) for determining priority of differential routes based on additional information and apply the differential route to searching for a guide route based on the determined priority. That is, if a plurality of differential routes to be applied to the guide route exist, the differential route application means references the additional information registered with each differential route, thereby determining which differential route is to be applied taking precedence over other differential routes for applying the higher-priority differential route to the guide route.

According to the embodiment 7, the more practical guide route can be provided.

As for the once determined priority, differential route registration means may register the index, numeric value, etc., indicating the priority additionally to the additional information to the corresponding differential route.

The differential route registration means may comprise priority determination means for determining priority when a differential route is registered and registering the index, numeric value, etc., indicating the priority additionally to the additional information.

In doing so, when the differential route is later applied to the guide route, the previously registered index, numeric value, etc., indicating the priority of the differential route can be referenced, thereby determining the priority easily.

Embodiment 8.

As an embodiment 8, differential route application means may comprise differential route deletion means for deleting an unnecessary differential route based on the priority thereof. That is, each differential route determined to be of a lower priority than a predetermined priority, for example, such that it is registered before a predetermined date and that the mobile unit has not been moved on the differential route since then and the differential route has not been applied to the guide route either among the registered differential routes, is deleted when the available capacity of memory 42 registering the differential routes falls below a predetermined capacity.

According to the embodiment 8, applying of unnecessary differential routes can be suppressed. The capacity of the memory 42 registering the differential routes can be saved.

Embodiment 9:

As an embodiment 9, differential route application means may comprise application determination means (not shown) for determining whether or not application of a differential route to a guide route is required in response to the position, the direction, the attribute, the history, the current state, etc., of the differential route. That is, only the truly required and practical differential route is applied to the guide route in response to the position, the direction, the attribute, the history, the current state, etc., of each differential route.

According to the embodiment 9, only the required differential route is applied and the more practical guide route can be provided.

Embodiment 10.

As an embodiment 10, application determination means may determine whether or not application of a differential route to a guide route is required based on the positional relationship between the current position of the mobile unit and the destination. That is, the differential route matching the move direction of the mobile unit located from the positional relationship between the current position and the destination is applied to the guide route.

According to the embodiment 10, the guide route fitted to the move direction of the user can be provided.

Embodiment 11.

As an embodiment 11, road traffic information acquisition means (not shown) for acquiring road traffic information of VICS (Vehicle Information and Communication System), etc., from an external system may be provided and application determination means may determine whether or not application of a differential route to a guide route is required based on the road traffic information concerning the differential route. That is, a check is made to ensure that a fault of closed to traffic, a traffic jam etc., caused by an accident, construction, control to travel in one direction only, lane control, etc., does not occur on the differential route to be applied based on the current road traffic information when the mobile unit moves before the differential route is applied to the guide route.

According to the embodiment 11, the guide route in conformity with the road traffic state at the moving time of the mobile unit can be provided.

Embodiment 12.

As an embodiment 12, input means 30 may comprise application condition input means (not shown) for enabling the user to enter an application condition of a differential route to a guide route and application determination means may determine whether or not application of the differential route to the guide route is required based on the entered application condition. That is, the user specifies whether or not the differential route is to be applied to the guide route, specifies that the differential route is to be applied to the guide route only under a specific condition, etc., through an operation switch 31, and the differential route is applied to the guide route accordingly.

According to the embodiment 12, the guide route more fitted to the user's taste can be provided.

Embodiment 13.

As an embodiment 13, application determination means may determine whether or not application of a differential route to a guide route is required based on the priority of the differential route. In the embodiments 10, 11, and 12, the application determination means determines whether or not application of the differential route to the guide route is required based on the move direction, the road traffic state, or the user-specified application condition; in the embodiment 13, the application determination means determines whether or not application of the differential route to the guide route is required based on the priority of the differential route determined by priority determination means based on additional information to the differential route. For example, only the differential route assigned a priority higher than a predetermined priority is applied to the guide route.

According to the embodiment 13, the guide route in more conformity with the practical use can be provided.

Embodiment 14.

As an embodiment 14, output means 50 may comprise discriminate output means (not shown) for discriminately displaying each differential route registered by differential route registration means or each differential route applied to a guide route as an image or guiding the use along the discriminated differential route with voice. That is, for example, it is made possible for the user to discriminately check each differential route registered in memory 42 according to the color or shape on a map screen of a display monitor 51. For example, it is made possible for the user to discriminately check the applied differential route portion in all route of the guide route according to the color or shape on the map screen of the display monitor 51.

According to the embodiment 14, the user can discriminately check each registered or applied differential route easily.

Embodiment 15.

As an embodiment 15, when the current position of the mobile unit exists in the proximity of the entry point into the differential route applied to the guide route or in the proximity on the differential route, discriminate output means may discriminately display the differential route as an image or guiding the use along the discriminated differential route with voice. That is, for example, while the mobile unit is moving along the guide route to which the differential route is applied, when it starts to approach the start point of the applied differential route or starts to move on the route, the differential route is discriminately displayed according to the color or shape on a map screen of a display monitor 51 or the fact that the mobile unit is approaching the differential route or is moving on the differential route or the like is announced with voice so that the user can acknowledge it.

According to the embodiment 15, the moving user can be discriminately guided along the applied differential route at the appropriate timing.

Embodiment 16.

As an embodiment 16, input means 60 may comprise discriminate information input means (not shown) for adding discriminate information to additional information to each differential route registered by differential route registration means. That is, the user can enter proper discriminate information to each differential route registered in memory 42 by operating an operation switch 31 for additionally registering the discriminate information to the additional information.

According to the embodiment 16, the user can discriminately check the differential route easily.

Embodiment 17.

As an embodiment 17, discriminate information may contain the identification name or identification number of each differential route or information indicating whether or not application of each differential route to a guide route is required. That is, the user can enter the name, number, etc., unique to each differential route registered in memory 42 by operating an operation switch 31 for additionally registering the discriminate information to the additional information. The user can specify whether or not each differential route is to be applied to the guide route for additionally registering the information to the additional information as he or she desires.

According to the embodiment 17, the user can discriminately check the differential route easily and can separately specify his or her desired differential route to be applied to the guide route.

In the embodiments, the bearing sensor 11, the speed sensor 12, and the GPS receiver 13 are used as the position detection means 10, as an example. However, any other sensor such as an acceleration sensor, an optical fiber gyro, or a vibration gyro, D-GPS (Differential—GPS), map matching, or a radio network of position information service, etc., in the PHS (Personal Handyphone System) or portable telephones, etc., may be used; in this case, similar advantages can also be provided.

The embodiments assume that the map information acquisition means 20 is the map information reader 21 for reading map information stored on a map information storage medium, such as CD-ROM or DVD-ROM, as an example and that the memory 42 in which the differential route registration means registers differential routes is memory IC (Integrated Circuit) such as RAM (Random Access Memory) with battery backup or flash memory, as an example. However, any other optical disk such as CD-R (Recordable), CD-RW (Rewritable), DVD-RAM, DVD-RW, or MD (Mini Disk), a magnetic disk such as flexible disk or hard disk, a memory card such as an IC memory card, a magnetic memory card, or an optical memory card, magnetic tape such as cassette tape, or any other readable/writable non-volatile storage medium may be used; in this case, similar advantages can also be provided. The map information reader 21 and the memory 42 may share any of the storage media, so that the system can be simplified.

The system may be configured so as to be able to conduct radio data communications with an external information server, etc., for using the Internet, etc., for acquiring map information from the external system, registering differential routes in the external system, and performing route search processing in the external system, whereby the system can be more simplified.

In the embodiments, the operation switch 31 is used as the input means 30, as an example. However, any other input machine such as a touch panel, a touch pen, a mouse, a track ball, an operation pad, a remote control, or a voice recognition unit may be used.

In the embodiments, the display monitor 51 is used as the output means 50, as an example. However, in addition to a display monitor such as a CRT (Cathode Ray Tube) monitor, a liquid crystal monitor, a head-up display, or a portable display terminal, a voice output machine such as a speaker, a headphone, an earphone, or a voice synthesizer or any other output machine such as a printer may be used.

The embodiments assume that the navigation system is a navigation system installed mainly in a vehicle, but the invention is not limited to it and may be applied to a navigation system installed in any other mobile unit such as a train, a ship, or an airplane, a portable information terminal carried by a human being, such as a PDA (Personal Digital Assistant), or the like; in this case, similar advantages can also be provided.

The invention is configured as described above and thus provides the following advantages:

The mobile unit navigation system according to the invention comprises position detection means for detecting the current position of a mobile unit, map information acquisition means for acquiring map information from a storage medium or an external system, input means for specifying a destination, route search means for searching for a guide route from the current position to the destination based on the map information, and output means for displaying the found guide route as an image or guiding a user along the found guide route with voice, wherein the route search means comprises move route extraction means for extracting a move route of the mobile unit based on a move path of the mobile unit provided by the position detection means and the map information, differential route registration means for extracting a differential route different from the guide route from the extracted move route and registering the differential route, and differential route application means for applying the registered differential route to searching for the guide route. Thus, the practical guide route fitted to the user's taste can be provided.

According to the mobile unit navigation system according to the invention, the move route extraction means comprises correction means, if the extracted move route contains a discontinuous part, for correcting the move route to a continuous move route by complementing the discontinuous part based on the peripheral map information. Thus, continuous, proper differential route extraction can be promoted.

According to the mobile unit navigation system according to the invention, the differential route is a continuous link chain and thus can be easily registered and applied to the guide route.

According to the mobile unit navigation system according to the invention, the differential route application means replaces a part of the guide route with the differential route. Thus, route search processing wherein the differential route is applied to the guide route is facilitated.

According to the mobile unit navigation system according to the invention, if the start point and the end point of the differential route are contained on the guide route, the differential route application means replaces the corresponding portion of the guide route from the start point to the end point with the differential route. Thus, route search processing wherein the differential route is applied to the guide route is more facilitated.

According to the mobile unit navigation system according to the invention, the differential route registration means registers each differential route to which additional information indicating the attribute and history of the differential route is added. Thus, appropriate determination in applying each differential route to the guide route can be promoted.

According to the mobile unit navigation system according to the invention, the additional information contains any of the following or any combination thereof, so that practical information in applying each differential route to the guide route can be provided:

1) Registration date and time of differential route;
2) move date and time of mobile unit on differential route;
3) number of times mobile unit has been moved on differential route;
4) move direction of mobile unit on differential route;
5) required time for mobile unit to pass through differential route;
6) passage speed of mobile unit on differential route;
7) position and direction of differential route;
8) route length of differential route;
9) road width of differential route;
10) number of lanes of differential route;
11) inclination degree of differential route;
12) pavement percentage of differential route;
13) open date of differential route;
14) toll required for differential route;
15) limited speed on differential route;
16) limited height on differential route;
17) limited weight on differential route;
18) traffic control on differential route (number of lanes, travel in one direction only, chain, etc.,) and period and times of traffic control;
19) duplication degree with other differential routes
20) number of times differential route has been applied to guide route.

According to the mobile unit navigation system according to the invention, the differential route application means comprises priority determination means for determining priority of each differential route based on the additional information and applies the differential route to searching for a guide route based on the determined priority. Thus, the guide route in more conformity with the practical use can be provided.

According to the mobile unit navigation system according to the invention, the differential route application means comprises differential route deletion means for deleting an unnecessary differential route based on the priority thereof. Thus, application of an unnecessary differential route can be suppressed.

According to the mobile unit navigation system according to the invention, the differential route application means comprises application determination means for determining whether or not application of a differential route to a guide route is required. Thus, only the required differential route is applied and the more practical guide route can be provided.

According to the mobile unit navigation system according to the invention, the application determination means determines whether or not application of a differential route to a guide route is required based on the positional relationship between the current position of the mobile unit and the destination. Thus, the guide route fitted to the move direction of the user can be provided.

The mobile unit navigation system according to the invention further comprises road traffic information acquisition means for acquiring road traffic information from an external system, wherein the application determination means determines whether or not application of a differential route to a guide route is required based on the road traffic information concerning the differential route. Thus, the guide route in conformity with the road traffic state at the moving time of the mobile unit can be provided.

According to the mobile unit navigation system according to the invention, the input means comprises application condition input means entering an application condition of a differential route to a guide route and the application determination means determines whether or not application of the differential route to the guide route is required based on the entered application condition. Thus, the guide route more fitted to the user's taste can be provided.

According to the mobile unit navigation system according to the invention, the differential route application means comprises application determination means for determining whether or not application of a differential route to a guide route is required and the application determination means determines whether or not application of the differential route to the guide route is required based on the priority of the differential route. Thus, the guide route in more conformity with the practical use can be provided.

According to the mobile unit navigation system according to the invention, the output means comprises discriminate output means for discriminately displaying each differential route registered by the differential route registration means or each differential route applied to a guide route as an image or guiding the use along the discriminated differential route with voice. Thus, the user can discriminately check each registered or applied differential route easily.

According to the mobile unit navigation system according to the invention, when the current position of the mobile unit exists in the proximity of an entry point into the differential route applied to the guide route or in the proximity on the differential route, the discriminate output means discriminately displays the differential route as an image or guiding the use along the discriminated differential route with voice. Thus, the moving user can be discriminately guided along the applied differential route at the appropriate timing.

According to the mobile unit navigation system according to the invention, the input means comprises discriminate information input means for adding discriminate information to additional information to each differential route registered by the differential route registration means. Thus, the user can discriminately check the differential route easily.

According to the mobile unit navigation system according to the invention, the discriminate information contains the identification name or identification number of each differential route or information indicating whether or not application of each differential route to a guide route is required. Thus, the user can discriminately check the differential route easily and can separately specify his or her desired differential route to be applied to the guide route.

The mobile unit navigation method according to the invention comprises the position detection step of detecting the current position of a mobile unit, the map information acquisition step of acquiring map information from a storage medium or an external system, the input step of specifying a destination, the route search step of searching for a guide route from the current position to the destination based on the map information, and the output step of displaying the found guide route or guiding a user along the found guide route with voice, wherein the route search step comprises the move route extraction step of extracting a move route of the mobile unit based on a move path of the mobile unit provided by the position detection step and the map information, the differential route registration step of extracting a differential route different from the guide route from the extracted move route and registering the differential route, and the differential route application step of applying the registered differential route to searching for the guide route. Thus, the practical guide route fitted to the user's taste can be provided.

What is claimed is:

1. A mobile unit navigation system comprising:
a position detector for detecting the current position of a mobile unit;
a map information acquisition unit for acquiring map information from a storage medium or an external system;
an input unit for specifying a destination;
a route search unit for searching for a guide route from the current position to the destination based on the map information; and
an output unit for displaying the found guide route as an image or guiding a user along the found guide route with voice;
wherein said route search unit comprises a move route extraction unit for extracting a move route of the mobile unit based on a move path of the mobile unit provided by said position detection unit and the map information, a differential route registration unit for extracting a differential route which reflects a difference between the guide route and the extracted move route and registering the differential route, and a differential route application unit for applying the registered differential route to searching for the guide route.

2. The mobile unit navigation system as claimed in claim 1 wherein said move route extraction unit comprises a correction unit, if the extracted move route contains a discontinuous part, for correcting the move route to a continuous move route by complementing the discontinuous part based on the peripheral map information.

3. The mobile unit navigation system as claimed in claim 1 wherein the differential route is a continuous link chain.

4. The mobile unit navigation system as claimed in claim 1 wherein said differential route application unit replaces a part of the guide route with the differential route.

5. The mobile unit navigation system as claimed in claim 4 wherein if the start point and the end point of the differential route are contained on the guide route, said differential route application unit replaces the corresponding portion of the guide route from the start point to the endpoint with the differential route.

6. The mobile unit navigation system as claimed in claim 1 wherein said differential route registration unit registers each differential route to which additional information indicating the attribute and history of the differential route is added.

7. The mobile unit navigation system as claimed in claim 6 wherein the additional information contains any of the following or any combination thereof:
1) Registration date and time of differential route;
2) move date and time of mobile unit on differential route;
3) number of times mobile unit has been moved on differential route;
4) move direction of mobile unit on differential route;
5) required time for mobile unit to pass through differential route;
6) passage speed of mobile unit on differential route;
7) position and direction of differential route;
8) route length of differential route;
9) road width of differential route;

10) number of lanes of differential route;
11) inclination degree of differential route;
12) pavement percentage of differential route;
13) open date of differential route;
14) toll required for differential route;
15) limited speed on differential route;
16) limited height on differential route;
17) limited weight on differential route;
18) traffic control on differential route (number of lanes, travel in one direction only, chain, etc.) and period and times of traffic control;
19) duplication degree with other differential routes
20) number of times differential route has been applied to guide route.

8. The mobile unit navigation system as claimed in claim 6 wherein said differential route application unit comprises a priority determination unit for determining priority of each differential route based on the additional information and applies the differential route to searching for a guide route based on the determined priority.

9. The mobile unit navigation system as claimed in claim 8 wherein said differential route application unit comprises a differential route deletion unit for deleting an unnecessary differential route based on the priority thereof.

10. The mobile unit navigation system as claimed in claim 8 wherein said differential route application unit comprises an application determination unit for determining whether or not application of a differential route to a guide route is required and an application determination unit determines whether or not application of the differential route to the guide route is required based on the priority of the differential route.

11. The mobile unit navigation system as claimed in claim 6 wherein said input unit comprises a discriminate information input unit for adding discriminate information to additional information to each differential route registered by said differential route registration unit.

12. The mobile unit navigation system as claimed in claim 11 wherein the discriminate information contains the identification name or identification number of each differential route or information indicating whether or not application of each differential route to a guide route is required.

13. The mobile unit navigation system as claimed in claim 1 wherein said differential route application unit comprises an application determination unit for determining whether or not application of a differential route to a guide route is required.

14. The mobile unit navigation system as claimed in claim 13 wherein said application determination unit determines whether or not application of a differential route to a guide route is required based on the positional relationship between the current position of the mobile unit and the destination.

15. The mobile unit navigation system as claimed in claim 13 further comprising a road traffic information acquisition unit for acquiring road traffic information from an external system, wherein said application determination unit determines whether or not application of a differential route to a guide route is required based on the road traffic information concerning the differential route.

16. The mobile unit navigation system as claimed in claim 13 wherein said input means comprises an application condition input unit entering an application condition of a differential route to a guide route and wherein said application determination unit determines whether or not application of the differential route to the guide route is required based on the entered application condition.

17. The mobile unit navigation system as claimed in claim 1 wherein said output means comprises a discriminate output unit for discriminately displaying each differential route registered by the differential route registration means or each differential route applied to a guide route as an image or guiding the use along the discriminated differential route with voice.

18. The mobile unit navigation system as claimed in claim 17 wherein when the current position of the mobile unit exists in the proximity of an entry point into the differential route applied to the guide route or in the proximity on the differential route, said discriminate output unit discriminately displays the differential route as an image or guiding the use along the discriminated differential route with voice.

19. A mobile unit navigation method comprising the steps of:
  detecting the current position of a mobile unit;
  acquiring map information from a storage medium or an external system;
  specifying a destination;
  searching for a guide route from the current position to the destination based on the map information; and
  displaying the found guide route or guiding a user along the found guide route with voice;
  wherein said route search step comprises the steps of:
    extracting a move route of the mobile unit based on a move path of the mobile unit provided by said position detection step and the map information;
    extracting a differential route which reflects a difference between the guide route and the extracted move route and registering the differential route; and
    applying the registered differential route to searching for the guide route.

* * * * *